INVENTORS
CHARLES L. SCHRADER
LEE W. RAMSTROM
BY
David W. Tibbott
ATTORNEY

INVENTORS
CHARLES L. SCHRADER
LEE W. RAMSTROM
BY

David W. Tibbetts

ATTORNEY

Sept. 13, 1966   C. L. SCHRADER ETAL   3,272,265
ROTARY IMPACT TOOL
Filed March 26, 1964   6 Sheets-Sheet 4

INVENTORS
CHARLES L. SCHRADER
LEE W. RAMSTROM
BY
David W. Tillett
ATTORNEY

INVENTORS
CHARLES L. SCHRADER
LEE W. RAMSTROM
BY
David W. Tibbott
ATTORNEY

Sept. 13, 1966   C. L. SCHRADER ET AL   3,272,265
ROTARY IMPACT TOOL

Filed March 26, 1964   6 Sheets-Sheet 6

INVENTORS
CHARLES L. SCHRADER
LEE W. RAMSTROM
BY
David W. Tillott
ATTORNEY

United States Patent Office 3,272,265
Patented Sept. 13, 1966

3,272,265
ROTARY IMPACT TOOL
Charles L. Schrader and Lee W. Ramstrom, Sayre, Pa., assignors to Ingersoll-Rand Company, New York, N.Y., a corporation of New Jersey
Filed Mar. 26, 1964, Ser. No. 354,851
10 Claims. (Cl. 173—93)

This invention relates to a power-operated rotary impact tool for applying rotary or angular impacts to fasteners such as threaded nuts, bolts, etc. In particular, this invention relates to a rotary impact tool mechanism for changing the rotating torque of a rotary motor, such as an air-driven motor, to a series of rapid rotary impacts which can be applied to a threaded nut for either driving it tight or for removing it.

Most rotary impact mechanisms in use today contain an anvil adapted to be connected to a wrench socket and a hammer rotated by a motor. The hammer is alternately engaged and disengaged from the anvil, being engaged to impact the anvil, thereafter being disengaged from the anvil to gather rotary speed again prior to striking another impact to the anvil. Various means are used for accomplishing this alternate engagement and disengagement between the anvil and hammer.

A well-known impact mechanism used today is disclosed in the U.S. patent to Amtsberg, No. 2,881,884. In this mechanism the hammer is driven by a motor and carries hammer dogs which are spring-biased axially away from the anvil to disengaged positions. Cams carried by the hammer and anvil periodically throw or cam the hammer dogs axially forward to strike a rotary impact with the anvil.

One disadvantage found in some impact tools using the above Amtsberg mechanism is that if the hammer is driven slower than its design speed, the hammer dogs may not be thrown far enough forward to engage the anvil dogs properly upon impact. When the hammer dogs are not thrown far enough forward, they "top" or barely strike the anvil dogs which causes rapid wear of such dogs. This disadvantage is explained by the fact that the camming or "throwing" force acting on the hammer dogs changes as the rotary speed of the hammer changes.

The principal object of this invention is to provide an impact mechanism which substantially minimizes or eliminates the disadvantages of the foregoing mechanisms and which operates according to a new concept.

Other important advantages include the following: to provide a rotary impact mechanism of the foregoing type which moves the hammer or hammer dogs forward with a consistent force which does not vary with the rotary speed of the hammer; and to provide a rotary impact mechanism which substantially eliminates the dog "topping" problem.

The above objects are attained in an impact mechanism wherein the hammer dogs are spring-biased toward normal engagement or impact position with the anvil and cams arranged between the anvil and hammer for normally raising the hammer dogs clear of the anvil until immediately before each impact when the cams release the hammer dogs whereby they are spring-moved into impact position. By being spring-moved into impact position, instead of being cam-moved, the hammer dogs are moved into impact position by the same force irrespective of the rotary speed of the hammer.

The invention is disclosed in the accompanying drawings wherein.

FIRST EMBODIMENT—FIGS. 1–3

Figure 1:
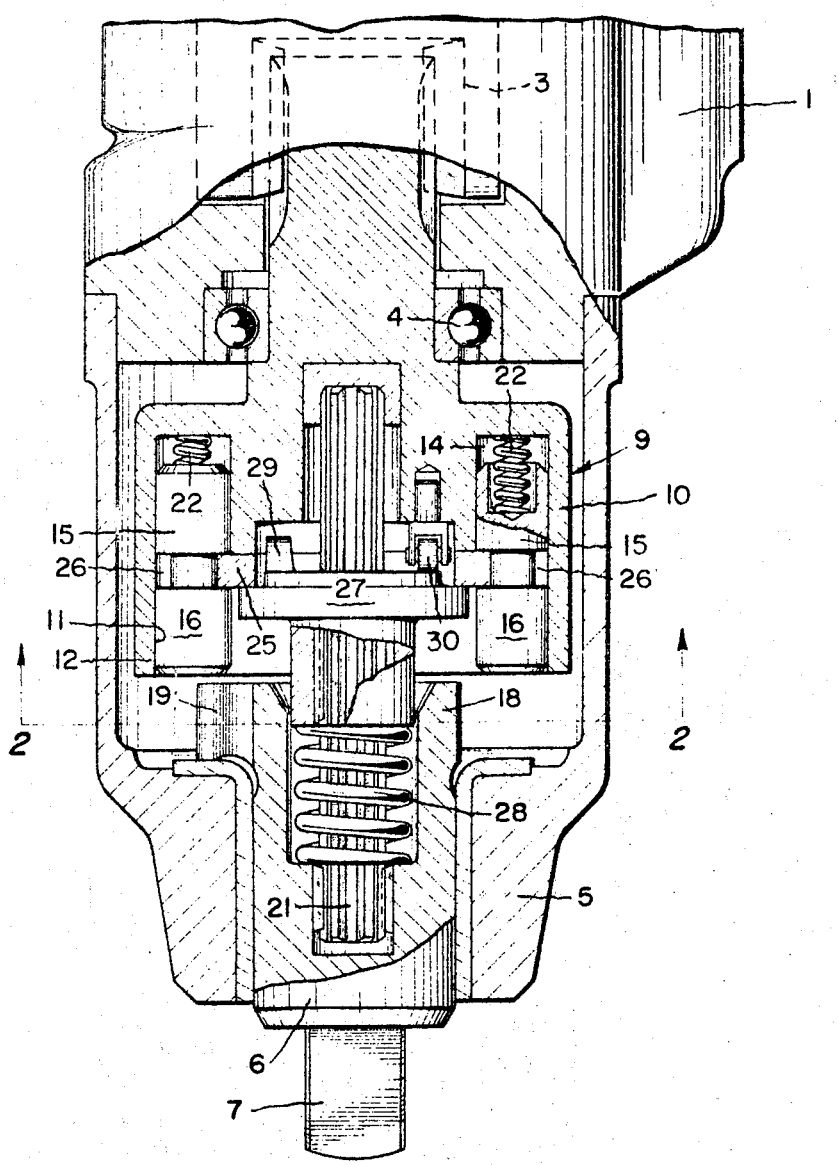
FIG. 1 is a longitudinal section with parts being broken away of one embodiment of rotary impact mechanism following the concepts of this invention.

The rotary impact tool shown in FIG. 1 conventionally includes a casing 1 containing a rotary motor having a motor shaft 3, shown in dotted lines. The motor is of a type which can be repeatedly stalled without being damaged, such as an air motor. The casing 1 further includes a front nose 5 containing a spindle 6 rotatively mounted therein. The spindle 6 has a square front end 7 adapting is for fitting into a nut driving socket (not shown). The spindle 6 is interconnected to the motor shaft 3 by an impact mechanism 9 which changes the rotary torque of the motor into a series of rotary impacts. This invention involves the impact mechanism 9.

The impact mechanism 9 includes a hammer rotor 10 of relatively large mass splined to the motor shaft 3 and rotatively mounted in a bearing 4. Thus, the hammer rotor 10 is fixed to and is rotatively driven by the motor. The hammer rotor 10 is cup-shaped with a forwardly opening central cavity 11 surrounded by an annular rim or wall 12. The annular wall 12 is provided with a pair of axially extending holes or sockets 14 which open forwardly and are located diagonally opposite each other on the circumference of the annular wall 12. A hammer dog 15 is mounted in each socket 14 for axial sliding movement. The forward end of each hammer dog is formed into a hammer dog tooth 16.

The spindle 6 is fixed at its rear end to an anvil 18 which has a pair of anvil teeth 19 projecting radially from the anvil 18 and diagonally located relative to each other for engaging the hammer dog teeth during the striking of an impact blow to the anvil 18. The anvil 18 and the hammer rotor 10 are in coaxial alignment and a splined axle 21 extends axially between both. The axle 21 is splined or keyed to the anvil 18 and rotatably seats in the hammer rotor 10. Hence, the hammer 10 is free to rotate relative to the axle 21 while the anvil 18 cannot rotate relative to the axle 21.

Whether or not the hammer dog teeth 16 impact the anvil teeth 19 depends on the axial positions of the hammer dogs 15 in the hammer rotor 10. Moving the hammer dogs 15 forward to place the hammer dog teeth 16 in the rotary path of the anvil teeth 19 causes the two pairs of teeth to collide as the hammer rotor rotates. The hammer dogs 15 can be moved axially rearward in the hammer rotor 10 to remove the hammer dog teeth 16 from the rotary path of the anvil teeth 19 so that the teeth clear each other as the hammer rotor 10 rotates. In the latter case, there is no impact.

Each hammer dog 15 is normally biased forwardly on the hammer rotor 10 by an individual spring 22 seated in its socket 14 in the hammer rotor 10 between the closed end of the socket 14 and the hammer dog 15. The pair of hammer dogs 15 are interlocked together to move axially in unison by a washer 25 which is located coaxially between the hammer dogs 15 and fits in annular slots 26 provided in each hammer dog 15.

A tubular cam 27 is slidably splined on the axle 21 and rides on the lower or front face of the washer 25. The tubular cam 27 is urged rearwardly by a spring 28 which is stronger than the combined strength of the springs 22. Thus, the tubular cam 27 and spring 28 operate to hold the hammer dogs 15 in their rearwardly retracted positions until the cam 27 is moved forwardly to release the hammer dogs 15.

The tubular cam 27 carries a rearwardly projecting lobe 29 adapted to engage a cam roller 30 rotatably mounted on the hammer rotor 10 in the cavity 11 as the hammer 10 rotates relative to the tubular cam 27 and the anvil 18. The cam lobe 29 and the cam roller 30 are located relative to each other in a manner to move the tubular cam 27 forward as the hammer dog teeth 16 rotatively approach the anvil teeth 19. As the tubular cam 27 releases the hammer dogs 15, they are moved axially forward into impact position by their springs 22. The hammer dogs 15 are forced to move forward in unison by the washer 25 which interconnects them.

Figure 3:
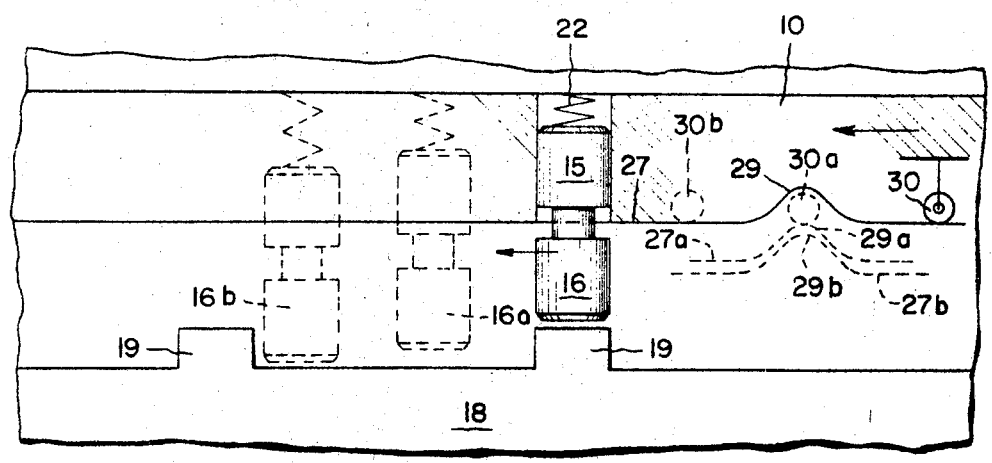
FIG. 3 is a diagrammatic view illustrating the operation of the FIG. 1 embodiment.

FIG. 3 diagrammatically illustrates the operation of the FIG. 1 embodiment and visualizes the moving elements of this embodiment located in a flat, elevational view. In other words, FIG. 3 represents the rotary path of the impact mechanism as if it were spread out on a flat plane in a manner similar to a flat map of the world. The hammer dog 15 is shown in solid lines in a retracted position and moving over an anvil tooth 19 in a direction to the left as indicated by the arrow. The solid line views of the cam lobe 29 and cam roller 30 are shown in relative positions corresponding to the solid line view of the hammer dog 15. At this moment, the roller 30 is nearing but has not reached the cam lobe 29. Also, at this moment, the cam 27 is in its retracted or uppermost position.

Soon after the hammer dog 15 passes over the anvil tooth 19 on the right side of FIG. 3 and as it approaches the other anvil tooth 19 on the left side of FIG. 3, the cam roller 30 engages the cam lobe 29 and pushes the cam 27 axially forward as shown by the dotted-line position 27a. Corresponding positions of the hammer dog tooth 16, the cam roller 30, and cam lobe 29 are indicated as 16a, 30a and 29a. At this time the hammer dog 15 is axially extended partly by its spring 22 and the cam roller 30a is at the crest of the cam lobe 29a.

Thereafter, the forward inertia imparted to the cam 27 by the cam roller 30 causes the cam 27 to be kicked axially forward an additional distance to the position 27b wherein the cam roller 30 disengages the cam lobe 29 and moves to the position 30b. This position of the hammer dog is shown by the position 16b wherein the hammer dog is fully forward and about to strike the anvil tooth 19. At the instant of impact, the cam roller 30 has travelled well beyond the cam lobe 29 so that the cam 27 can force the hammer dog 15 to its retracted position immediately after impact, thus disengaging the hammer dog tooth 16 from the anvil tooth 19.

Since the hammer dogs 15 are spring-moved into axially extended positions by the springs 22, they will be moved axially forward substantially the same distance each time regardless of the rotary speed of the hammer rotor 10. Thus, the rotary speed of the hammer rotor 10 can vary over a wide range without changing the forward movement of the hammer dogs 15. As a result, the hammer dogs 15 are less likely to "top" or barely strike the anvil teeth 19 with a change in speed of the hammer rotor 10. As explained earlier, "topping" is undesirable in impact mechanisms because it greatly increases wear and reduces the efficiency of the impacts.

SECOND EMBODIMENT—FIGS. 4 AND 5

Figure 4:
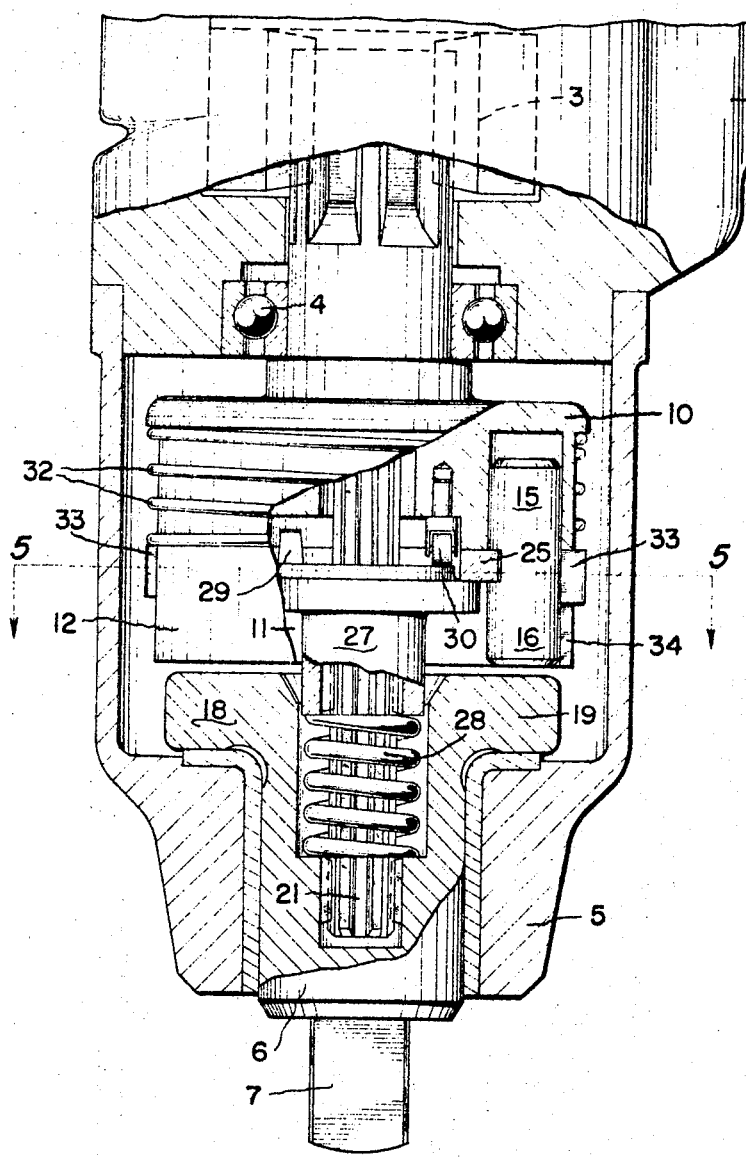
FIG. 4 is a longitudinal section similar to FIG. 1 of a second embodiment.
Figure 5:
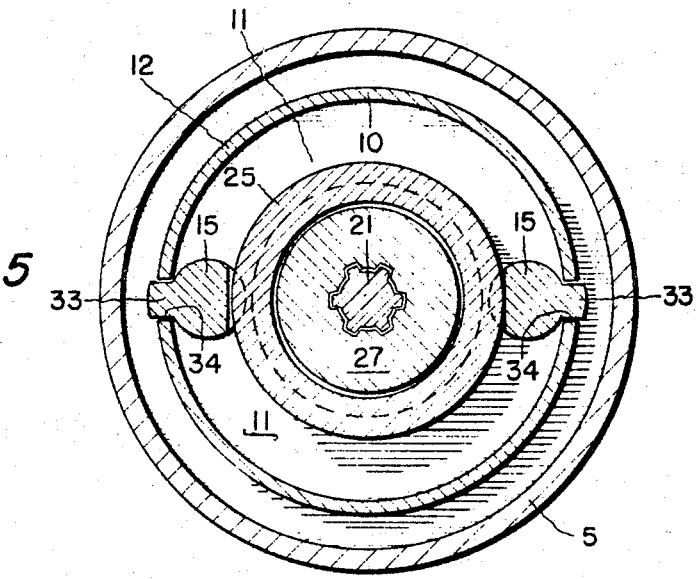
FIG. 5 is a section taken on line 5—5 of FIG. 4.
Figure 9:
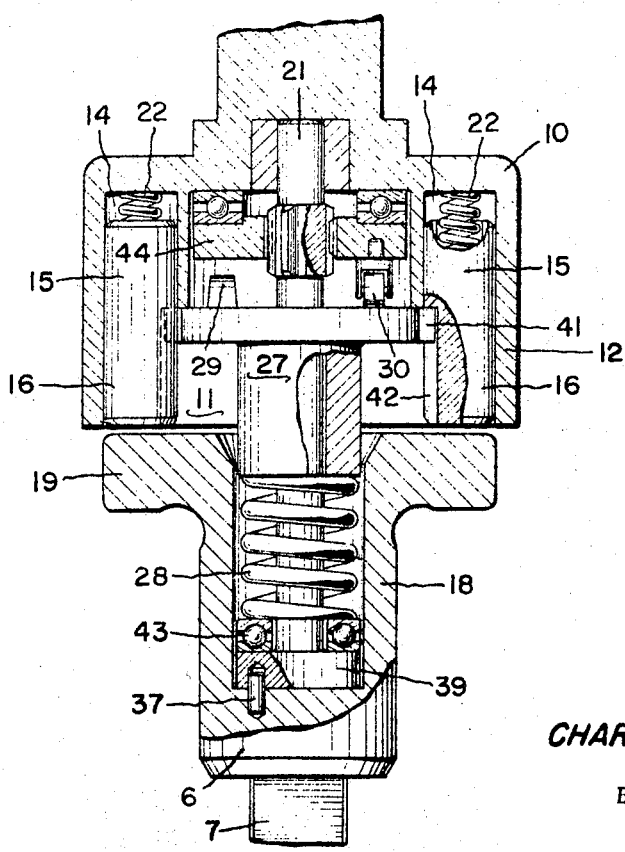
FIG. 9 is a longitudinal section of a fourth embodiment.

The principal difference in the second embodiment as compared to the first embodiment is that the individual hammer dog springs 22 are eliminated and replaced by a large diameter coil spring 32 mounted on and encircling the circumference of the hammer rotor 10. The spring 32 presses against keys 33 which are integrally fixed on each hammer dog 15 and project through vertical slots or key guides 34 formed in the annular wall 12 of the hammer rotor 10. The keys 33 project radially outward from the slots 34 far enough for the spring 32 to engage the upper ends of the keys 33 and bias the hammer dogs 15 downwardly, looking at FIG. 4. The operation of the second embodiment shown in FIGS. 4 and 5 is the same as the first embodiment shown in FIGS. 1 to 3.

THIRD EMBODIMENT—FIGS. 6 TO 8

Figure 2:
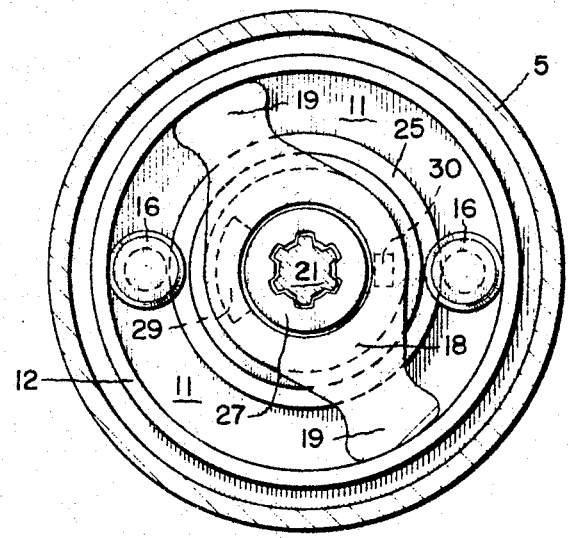
FIG. 2 is a section of FIG. 1 taken along line 2—2.
Figure 6:
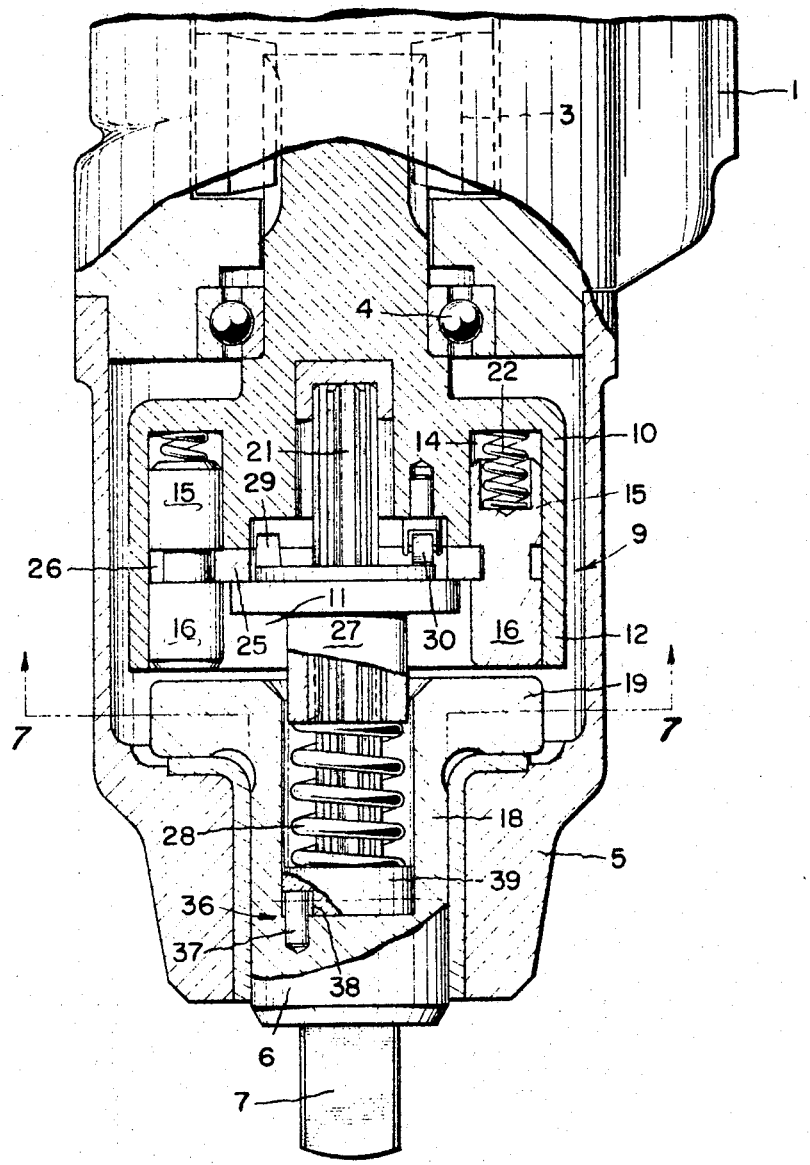
FIG. 6 is a longitudinal section of a third embodiment.
Figure 7:
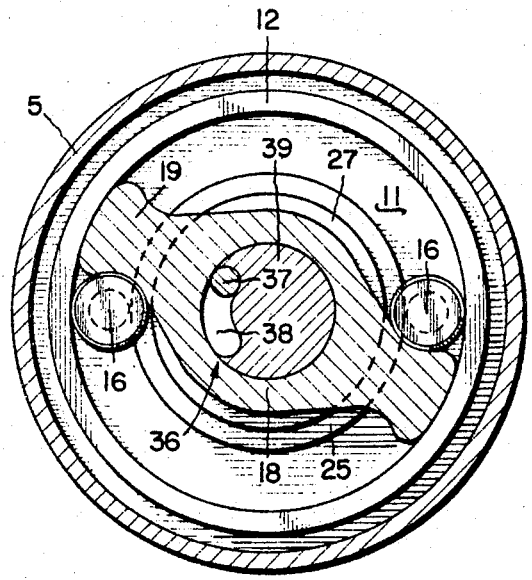
FIG. 7 is a section taken on line 7—7 of FIG. 6.

The third embodiment shown in FIGS. 6 to 8 is similar to the first embodiment shown in FIGS. 1 to 3 and additionally incorporates a lost motion connection 36 between the splined axle 21 and the anvil 18 which allows a limited angular movement between the axle 21 and the anvil 18. Since the axle 21 is splined to the cam 27, this lost motion connection 36 allows the occurrence of a limited amount of relative angular movement between the cam 27 and anvil 18. The purpose of this relative angular movement will be apparent from an understanding of the operation of this embodiment.

The lost motion connection 36 is provided by an eccentric pin 37 fixed in the anvil 18 at a position eccentric to the axis of the axle 21 and extending upward into an arcuate slot 38 formed in an enlarged cylindrical foot 39 fixed to the bottom end of the axle 21, as seen in FIG. 6.

Figures 8A, 8B, 8C:
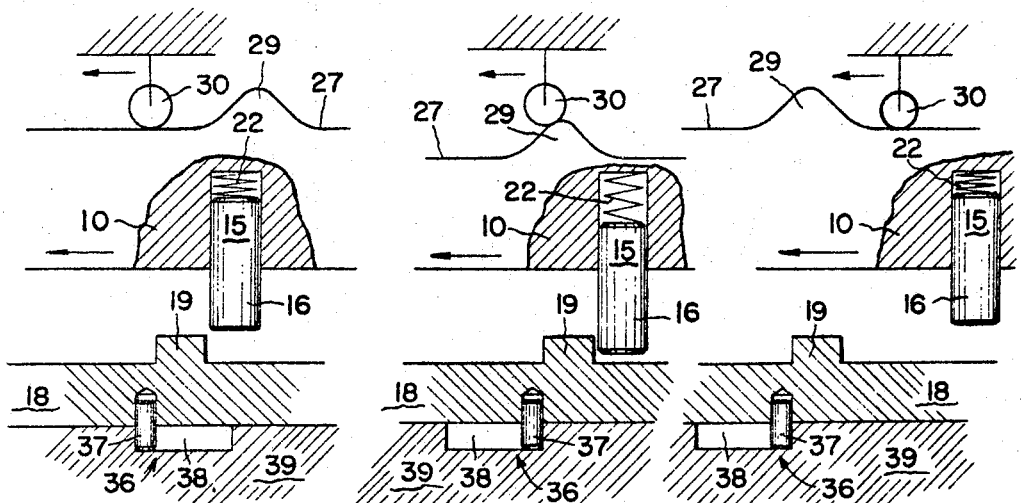
FIGS. 8A, 8B and 8C are diagrammatic views showing the moving parts of the FIG. 6 embodiment in various positions for illustrating the operation of this embodiment.

The operation of the third embodiment is diagrammatically illustrated sequentially in FIGS. 8A to 8C. In FIG. 8A, the hammer rotor 10 is moving from right to left in the direction of the arrow and carrying both the hammer dog 15 and the cam roller 30 at the same speed. The hammer dog 15 is fully retracted into the hammer rotor 10 where it is not in the path of the anvil tooth 19. The anvil 18 and its tooth 19 are stationary and the cam lobe 29 and the foot 39 on the axle 21 are rotated relative to the anvil 18 until the eccentric pin 37 is engaging the right end of the slot 38 in the foot 39. The cam lobe 29 is forced toward the foregoing relative to the anvil 18 as the result of the cam roller 30 starting to ride up the right side of the cam lobe 29.

FIG. 8B shows the foregoing elements after the cam roller 30 has passed over the top and has just started down the left side of the cam lobe 29, and the hammer dog 15 is forced forward to a fully extended position and is about to impact the anvil tooth 19. In this position, the eccentric pin 37 is still in engagement with the right end of the arcuate slot 38.

As the hammer dog 15 impacts the anvil tooth 19 and begins to retract, the cam roller 30 is rolling down the left side of the cam lobe 29 and creates a force rotatively biasing the cam 27 toward the right until the eccentric pin 37 engages the left end of the slot 38. This movement of the cam 27 relative to the anvil 18 moves the cam lobe 29 out from under the cam roller 30 and allows the hammer dog 15 to be retracted after impact. FIG. 8C shows the hammer dog 15 immediately after impact and retraction whereby it can pass over the anvil tooth 19 and start another cycle.

The lost motion connection 36 allows the cam lobe 29 to be placed angularly closer to the anvil tooth 19 than in the case of the first embodiment shown in FIGS. 1 to 3. In the first embodiment, the cam lobe 29 must allow the hammer dog 15 to be thrown forward to an impact position and then must move angularly past the cam roller 30 sufficiently for the hammer dog 15 to be retracted after impact. This means that the hammer dog 15 must be extended angularly further ahead of the impact position than in the case of the third embodiment shown in FIGS. 6 to 8.

FOURTH EMBODIMENT—FIG. 9

This embodiment is similar to the third embodiment shown in FIGS. 6 to 8 with the exception that the cam 27 is keyed to the hammer rotor 10 and the cam roller 30 is keyed to the axle 21.

The cam 27 is rotatively mounted on the axle 21 and has diametrically placed keys 41 sliding and keyed in vertical slots 42 formed in the hammer dogs 15. The lower end of the spring 28 rests on a bearing 43 which allows the spring 28 to rotate with the cam 27 relative to the axle 21.

The cam roller 30 is mounted on a disc 44 which is splined to the axle 21. Thus, the disc 44 and cam roller 30 remain relatively stationary as the hammer rotor 10 rotates. A bearing 45 is disposed between the disc 44 and the inside of the hammer rotor 10 to allow free relative movement between these members.

Although several preferred embodiments of the invention have been illustrated and described in detail, it will be understood that the invention contemplates other embodiments and variations of the basic invention.

Having described our invention, we claim:

1. A rotary impact tool comprising:
 (a) a casing;
 (b) a rotary motor in said casing;
 (c) a rotor driven by said motor;
 (d) an anvil member rotatably mounted on said casing adjacent said rotor and having a spindle adapted to apply a series of rotary impacts to a workpiece;
 (e) an anvil tooth integrally fixed on said anvil member and adapted to receive rotary impacts;
 (f) a hammer member including a hammer tooth mounted on said rotor in a manner causing the hammer member to rotate with the rotor and allowing the hammer tooth to move toward and away from said anvil member between alternate positions, one position being an impact position wrerein the hammer tooth is located to strike said anvil tooth as said rotor turns and the other position being a non-impact position wherein the hammer tooth clears said anvil tooth as the rotor turns;
 (g) means biasing said hammer tooth toward its impact position; and
 (h) a pair of cam elements normally cooperating to hold said hammer member in its non-impact position as said rotor turns relative to said anvil member, one of said cam elements being connected to said anvil member and the other cam element being connected to said hammer member, said cam elements being arranged to release said hammer member as said hammer tooth approaches and passes said anvil tooth whereby said biasing means can move said hammer member to said impact position in time to impact said anvil.

2. A rotary impact mechanism comprising:
 (a) an anvil having an anvil tooth;
 (b) a hammer having a hammer tooth adapted to strike the anvil tooth for delivering a rotary impact thereto;
 (c) said hammer tooth being mounted to move relative to said anvil to a position wherein said anvil and hammer teeth can clear each other;
 (d) means for rotatively driving said hammer;
 (e) means biasing said hammer tooth to a position wherein said anvil and hammer teeth collide as said hammer rotates;
 (f) cam means mounted between said anvil and hammer and operative normally to lift and hold said anvil and hammer teeth clear of each other to prevent a collision therebetween; and
 (g) said cam means being arranged to release said anvil and hammer teeth as the anvil and hammer teeth rotatively approach each other whereby said biasing means will move said hammer tooth into a position to collide with said anvil tooth.

3. A rotary impact mechanism comprising:
 (a) a frame;
 (b) an anvil rotatably mounted on said frame;
 (c) a hammer rotatably mounted on said frame including means movable relative to said anvil between an impact position wherein it delivers a rotary impact to said anvil and a non-impact position wherein it can rotate free of the anvil;
 (d) means biasing said movable means to said impact position;
 (e) a pair of cam elements interconnected between said anvil and hammer, one of said cam elements being mounted on said anvil and the other being mounted on said hammer, said cam elements being operative in their normal positions on their respective mounting members to engage and hold said movable means in said non-impact position wherein said movable means does not impact said anvil; and
 (f) said cam members being arranged to release said movable means as it rotatively approaches said anvil so that said biasing means moves said movable means to said impact position.

4. The impact mechanism of claim 3 wherein:
 (a) one cam member is movably mounted on its mounting member and is biased to its normal position by a first spring means; and
 (b) said means biasing said movable means toward said impact position is a second spring means which is weaker than said first spring means.

5. The impact mechanism of claim 4 wherein:
 (a) said movable means is mounted to move axially toward and away from said anvil between said impact position and said non-impact position.

6. The impact mechanism of claim 5 wherein:
 (a) one of said cam members is movably mounted on said anvil for movement relative to it and keyed to said anvil for rotation with it; and
 (b) said one cam member is biased toward its normal position relative to said anvil by said first spring means.

7. The impact mechanism of claim 6 wherein:
 (a) the cam member on said anvil is mounted for limited rotary movement relative to the anvil.

8. The impact mechanism of claim 6 wherein:
 (a) said one cam member is movably mounted on said anvil for movement relative to said hammer.

9. The impact mechanism of claim 6 wherein:
 (a) the other cam member is fixed on said hammer.

10. The impact mechanism of claim 9 wherein:
 (a) said movable means is a hammer dog slidably mounted in said hammer.

References Cited by the Examiner

UNITED STATES PATENTS

| 2,539,678 | 1/1951 | Thomas | 173—93.6 |
|---|---|---|---|
| 2,881,884 | 4/1959 | Amtsberg | 173—93.6 |
| 3,198,303 | 8/1965 | Brown | 173—93 |
| 3,208,568 | 9/1965 | Vaughn | 173—93 |

FOREIGN PATENTS 731,255  6/1955  Great Britain.

FRED C. MATTERN, Jr., *Primary Examiner.*

LAWRENCE P. KESSLER, *Assistant Examiner.*